United States Patent Office 2,710,019
Patented June 7, 1955

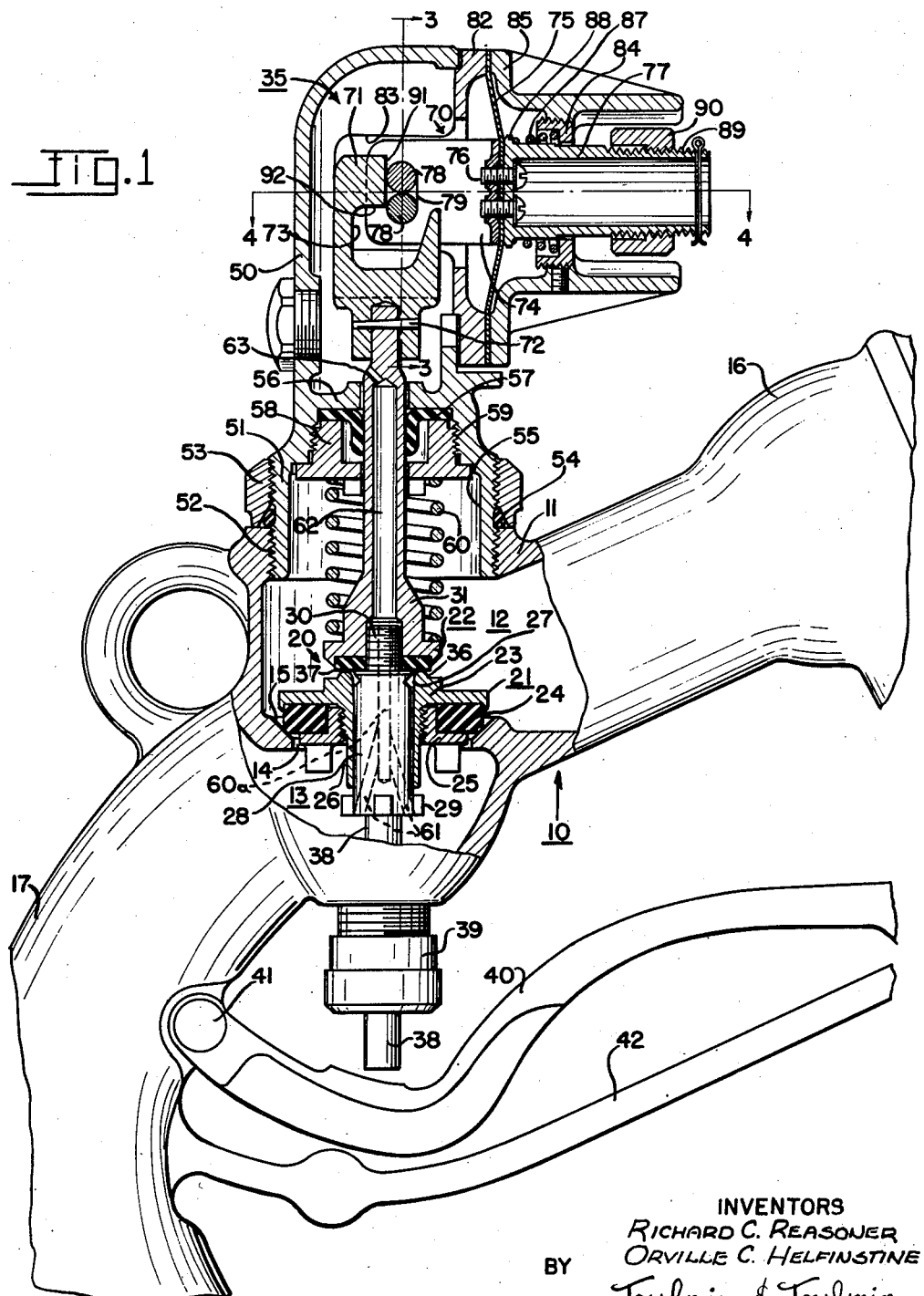

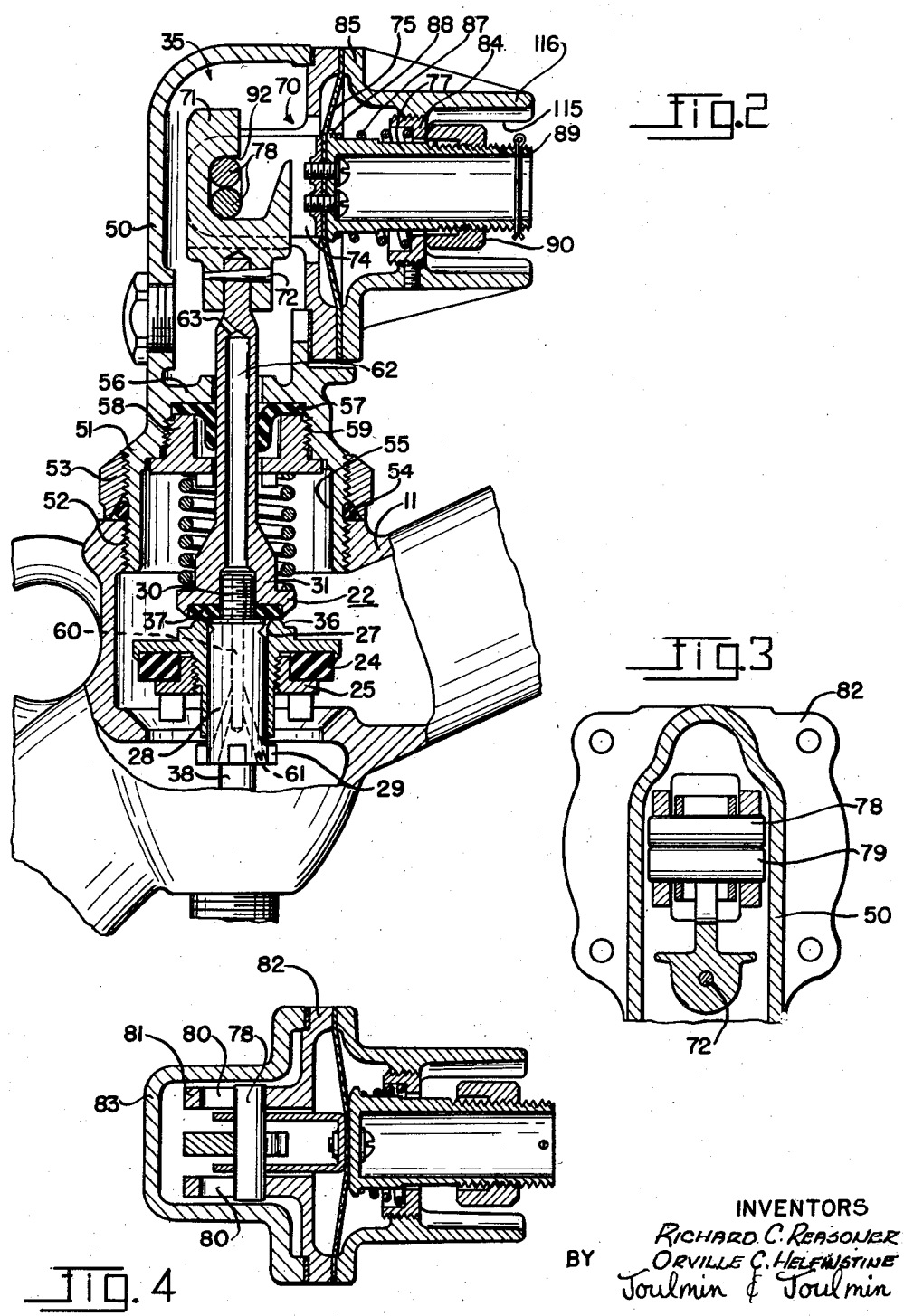

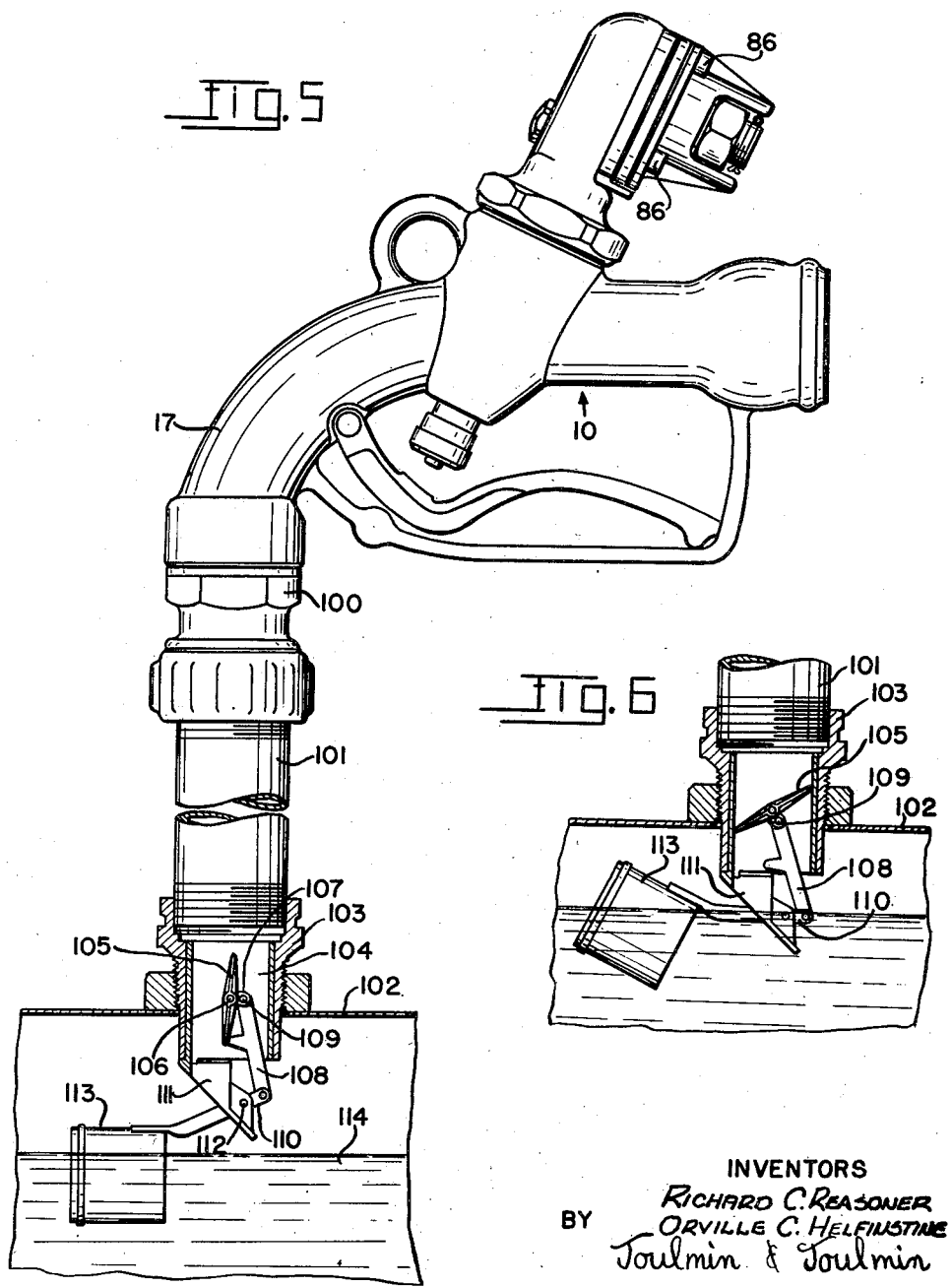

2,710,019

LIQUID FLOW CONTROL VALVE

Richard C. Reasoner and Orville C. Helfinstine, Dayton, Ohio, assignors to Buckeye Iron & Brass Works, Dayton, Ohio, a corporation of Ohio Application February 19, 1951, Serial No. 211,662

4 Claims. (Cl. 137—463)

This invention relates to automatic shut-off valves for controlling the flow of liquids into a closed vessel, and particularly to automatic shut-off valves adapted for controlling the flow of gasoline into an underground storage tank whereby to cut off the flow of gasoline into the storage tank when a predetermined quantity of gasoline is within the tank.

An object of the invention is to provide an improved construction of an automatic shut-off valve that will be extremely sensitive in its operation whereby the shut-off valve is actuated to shut off the flow of liquid through the same in response to a small rise in pressure of the liquid discharging from the flow control valve.

It is another object of the invention to provide an improved automatic shut-off valve for controlling the flow of liquid wherein the valve is actuated in response to an increase in pneumatic pressure resulting from the application of hydraulic pressure thereon.

Still another object of the invention is to provide a flow control valve for automatic operation in accordance with the foregoing objects wherein the pneumatic chamber for the actuation of the valve is retained substantially free of liquid during non-operating periods of the valve and into which liquid is admitted during operating periods of the valve to apply liquid pressure to the air within the pneumatic chamber and thereby actuate the valve.

Another object of the invention is to provide an automatic shut-off valve for controlling the flow of the liquid in which liquid from the discharge chamber of the valve is delivered into a pneumatic chamber of the valve for operating the valve to obtain automatic shut-off thereof.

Still another object of the invention is to provide an automatic flow control shut-off valve in accordance with the foregoing objects wherein the sensitivity of operation of the valve can be controlled without in any way adding to the resistance of operation of any parts of the valve or of applying varying pressures to parts of the valve to obtain a control over the sensitivity of the valve.

Still another object of the invention is to provide an automatic shut-off valve in accordance with the foregoing objects, that is operated in response to back pressure of liquid built up in the nozzle of the valve.

Further objects and advantages will become apparent from the drawings and the following description.

In the drawings:

Figure 1 is a cross-sectional view of the valve of this invention, with certain minor portions thereof illustrated in elevation, the valve being illustrated in closed position.

Figure 2 is a cross-sectional view similar to Figure 1 but illustrating the valve in open position.

Figure 3 is a cross-sectional view taken along line 3—3 of Figure 1.

Figure 4 is a cross-sectional view taken along line 4—4 of Figure 1.

Figure 5 is an elevational view of the valve of this invention illustrated in use in filling a storage tank which is shown in cross-section.

Figure 6 is a cross-sectional view of the storage tank illustrated in Figure 5 but showing the float valve thereof in closed position.

In this invention the automatic shut-off valve 10 consists of a valve body 11 having an inlet chamber 12 and an outlet chamber 13 connected by an opening 14 that has formed therein the valve seat 15. The valve body 11 has a hollow projecting portion 16 that connects with the inlet chamber 12 and is adapted to be connected to a flexible hose. The body 11 also has a hollow nozzle portion 17 that connects with the discharge chamber 13.

The flow control valve 20 consists of a large primary valve 21 and a small secondary valve 22. The valve 21 consists of a valve body 23 that has a valve element 24 secured thereto by a retaining ring 25 threadedly received on the extension 26 of the valve body 23. The valve element 24 seats upon the valve seat 15 to close the flow passage 14.

The valve body 23 has an annular bore 27 that receives a cylindrical stem 28 having projections 29 on the lower end thereof and a threaded portion 30 on the opposite end. The threaded portion 30 of the stem 28 threadedly engages a stem 31 that extends upwardly into the air chamber 35 of the valve actuator hereinafter described.

The valve body 23 has an annular protrusion 36 around the bore 27 that forms a valve seat upon which a valve element 37 seats. The valve element 37 is retained between the stem 28 and the stem 31 and is limited in its upward travel by the stop members 29 on the stem 28 abutting the lower end of the projecting portion 26 of the valve body 23, thereby limiting the degree of opening of the secondary valve 22.

The stem 28 is provided with a reduced diameter portion 38 that extends to the exterior of the valve body 11 through a packing gland 39 into engagement with a manually-operated actuating lever 40. The lever 40 is pivotally carried on the valve body 11 by a pivot pin 41. A suitable guard 42 is provided for the actuating lever 40.

The automatic actuator for the valve consists of a body 50 having the heretofore-mentioned air chamber 35 therein. The body 50 has the threaded extension 51 in threaded engagement with the threaded opening 52 in the valve body 11 that is axially aligned with the opening 14 whereby to permit removal of the valves 21 and 22 from the valve body 11. A jam nut 53 is threadedly received on the threaded extension 51 and secures a resilient seal ring 54 between the jam nut and the valve body 11 to prevent loss of liquid through the threaded opening 52.

The extension 51 on the actuator body 50 has a recessed chamber 55 that is closed by a wall 56. The stem 31 projects into the air chamber 35 through the wall 56.

A resilient seal member 57 is provided around the upper end of the stem 31 and is secured in position by means of a retaining ring 58 provided with threaded engagement 59 with the wall of the chamber 55.

A compression spring 60 extends between the retaining ring 58 and the secondary valve 22 to normally urge the valves 21 and 22 in the closed position as illustrated in Figure 1.

The stem 28 is provided with an axial passage 60a that connects at its lower end with a pair of passages 61 which open into the discharge chamber 13 of the valve 10. The passage 60a in the stem 28 connects with an axial passage 62 in the stem 31. The stem 31 also has a passage 63 at the upper end thereof that connects the passage 62 with the air chamber 35 at the lower portion thereof immediately above the bottom wall 56 of the chamber 35.

A latching mechanism 70 is provided for latching the primary valve 21 in open position and upon development of a predetermined liquid back pressure in the discharge chamber 13 provides for automatic release of the primary valve 21 to allow it to seat upon the seat 15 and thereby shut off flow of liquid through the opening 14 to the nozzle 17.

The latching mechanism 70 consists of a latch member 71 that is secured to the upper end of the stem 31 within the air chamber 35 by means of a pin 72, or other suitable fastening device. The latch member 71 is formed to provide a substantially C-shaped opening 73 therein in which the throat of the C-shaped opening faces upwardly.

A U-shaped actuating member 74 is secured on one side of a diaphragm 75 and is secured to the diaphragm by means of screws 76 that extend through the diaphragm from engagement with a cylindrical member 77 secured to the opposite side of the diaphragm 75. The U-shaped member 74 carries a pair of rolls 78, that provide a detaining member, the rolls being positioned within slots 79 provided in each leg of the U-shaped actuating member 74.

The ends of the rolls 78 are carried in slots 80 provided in the bracket extensions 81 projecting from the diaphragm cover plate 82. The rolls are limited in axial movement by means of the retaining cage 83 formed as a part of the body 50.

The cylindrical member 77 extends through a guide ring 84 threadedly received in a diaphragm retaining cover 85 that cooperates with the cover 82 whereby to retain the diaphragm 75 therebetween, cap screws 86 extending between the diaphragm covers 85 and 82.

A compression spring 87 is placed between the guide ring 84 and a flange 88 on one end of the cylindrical member 77 whereby to urge the diaphragm in a leftward direction, as viewed in Figures 1 and 2.

The cylindrical member 77 is provided with a threaded portion 89 that receives a nut 90 thereon adjustable axially of the member 77 whereby to provide a limit control to control the position of the diaphragm 88 in its leftward movement, as viewed in Figures 1 and 2, and thereby control the engaged position of the rolls 78 relative to the latch member 73.

When the shut-off valve is in closed position, as shown in Figure 1, the latching mechanism is in released position with the rolls 78 positioned outside the opening 73 and against the flat face 91 of the latch member 71.

When the operator opens the shut-off valve by drawing upwardly on the actuating lever 40, thus moving the stems 28 and 31 and the latch mechanism 71 upwardly, the rolls 78 drop into the opening 73 with the upper roll in engagement with the shoulder 92 provided in the latch member 71, as illustrated in Figure 2. At this time, the adjusting nut 90 engages the guide ring 84 to limit the position of the rolls 78 in their position in engagement with the shoulder 92.

As illustrated in Figure 2, the adjusting nut has been moved toward the right-hand end of the member 77 to allow the rolls 78 full entry into the opening 76 for their position of greatest depth into the opening relative to the shoulder 92 of the latch member 71. As the adjusting nut 90 is rotated to move the same in a leftward direction upon the member 77, the position of the rolls 78 within the opening 73 will be substantially shallower so that a vertical line through the axes of the rolls 78 approaches alignment with the flat face 91 of the latch member 71.

As the vertical line through the axes of the rolls 78 approaches alignment with the face 91, less movement is required of the diaphragm 75 to release the latch 71 from the rolls 78 and thereby permit the valve to close upon such release. Also, as the vertical line through the axes of the rolls 78 approaches alignment with the flat face 91, less pressure is required to be developed in the chamber 35 to actuate the diaphragm the short distance required for causing release of the latch member 71.

Thus, the sensitivity of the release 70 of the valve can be adjusted by rotation of the nut 90, and the pressure differential required for operation of the valve can be very accurately controlled.

The discharge nozzle 17 of the valve 10 is provided with a connector 100 adapted for detachable connection with a stand-pipe 101 extending from a storage tank 102.

The lower end of the stand-pipe 101 connects into a fitting 103 that has the passage 104 in which there is placed a butterfly valve 105 pivoted on the pivot pin 106. The valve 105 has an ear 107 pivotally connected with an arm 108 by the pivot pin 109. The arm 108 is pivotally connected to the lever arm 110 pivoted to the bracket extension 111 by means of the pivot pin 112. The lever arm 110 carries a float actuator 113.

As illustrated in Figure 5, the float 113 is in its lower position in which the valve 105 is open. As the level of the liquid 114 recedes from the float 113, the valve 105 will remain in open position.

When the tank 102 is being filled with liquid and the liquid level reaches a predetermined height, the float 113 will move upwardly, as illustrated in Figure 6, to thereby close the valve 105.

When the valve 105 closes, liquid being discharged from the nozzle 17 will back up into the discharge chamber 13 of the valve 10 and will pass upwardly through the passages 61, 60a, 62 and 63 into the air chamber 35 to compress the air in the air chamber by the entry of the liquid therein whereby to cause the diaphragm 75 to move in a rightward direction, as viewed in Figure 2. When the diaphragm 75 moves in a rightward direction, the rolls 78 are drawn rightwardly relative to the latch 71, as viewed in Figure 2, thereby releasing the latch 71 to permit the spring 60 to close the valve 21 and thereby stop flow of liquid through the same.

Any liquid that enters the air chamber 35 during the automatic closing operation of the valve 10 will drain from the chamber 35 through the passages 63, 62, 60a and 61 into the discharge chamber 13 and from there pass through the nozzle 17. Thus, the air chamber 35 is drained free of liquid after each operation of the valve so that the chamber 35 cannot at any time become liquid-bound. As soon as the liquid drains from the air chamber 35, the chamber is open to atmospheric pressure through the aforementioned passages and the nozzle 17. Thus, the initial pressure in the chamber 35 at the beginning of each operation of the automatic valve 10 is at a constant value, so that a predetermined quantity of liquid entering the chamber 35 will cause operation of the latching mechanism 70 under exactly the same operating conditions each time the valve is operated.

The automatic control valve is, therefore, more positive in its operation and erratic, quick-cycle operation of the valve is eliminated and yet the valve is extremely sensitive to changes in pressure conditions in the air chamber 35 to obtain sensitive automatic operation of the valve.

To open and set the valve in its open position, the operator moves the actuating lever 40 against the stem 38 to lift the secondary valve 22 from its seat 36. This relieves pressure against the primary valve 21 so that further movement of the stem 38 will lift the primary valve 21 when the projections 29 on the stem 38 engage the lower end of the primary valve 21.

Upward movement of the stems 28 and 31 carries the latch member 71 upwardly relative to the rolls 78 until the shoulder 92 is above the upper of the rolls 78 whereby the compression spring 87 moves the rolls 78 in a leftward direction, as viewed in Figure 1, to place the rolls beneath the shoulder 92, thereby latching the valve 21 in open position. The valve will not close until it is operated automatically, as heretofore described.

However, should it become necessary to manually release the valve because of some unusual condition, the operator can grasp the nut 90 with his fingers to pull the cylindrical member 77 and thus the diaphragm member 75 in a rightward direction, as viewed in Figure 2, whereby to release the latch 71 and permit the valve 21 to close. Finger openings 115 are provided in the guard cage 116 around the nut 90 to provide for manual grasping of the nut.

While the apparatus disclosed and described herein illustrates a preferred form of the invention, yet it will be understood that mechanical alterations can be made without departing from the spirit of the invention, and that modifications that fall within the scope of the appended claims are intended to be included herein.

Having thus fully described my invention, what I claim as new and desire to secure by Letters Patent, is:

1. An automatic control valve comprising in combination a valve body having a passage therein for the flow of fluid through the body, a self-closing valve in said body for closing said passage to the flow of fluid, manually actuated means connected with said self-closing valve for opening the same, means forming a closed air chamber in said valve body, said air chamber having a flexible wall, an actuator within said air chamber connected to said flexible wall, a slidably mounted stem extending from said valve into said air chamber, latching means within said air chamber and including a latch member on said stem within said air chamber, said latching member having a shoulder thereon transverse to the sliding of said stem, detent means on said actuator and engageable with said shoulder to hold said valve in the open position, means biasing said flexible wall inwardly of said air chamber to urge said detent means into engagement with said latching member, means forming a passage connecting the discharge side of the control valve with said air chamber for delivery of fluid therethrough into said air chamber for hydraulic compression of the air in said air chamber to actuate said flexible wall outwardly whereby movement of said actuator will disengage said detent means from said latch member, and means connected to said actuator to limit the degree of engagement to said detent means with said latching member.

2. A control valve comprising in combination, a valve body having a passage therein for the flow of fluid through the body, a self-closing valve in said body for closing said passage to the flow of fluid, manually actuated means connected with said self-closing valve for opening the same, means forming a closed air chamber in said valve body, said air chamber having a flexible wall, an actuator within said air chamber connected to said flexible wall, a slidably mounted stem extending from said valve into said air chamber, a latching mechanism within said air chamber and including a latch member on said stem, said latching member having a shoulder thereon transverse to the sliding of said stem, detent means on said actuator and engageable with said shoulder to hold said valve in the open position, means biasing said flexible wall inwardly of said air chamber to urge said detent means into engagement with said latching member, a member on said actuator movable therewith and relative to said valve body, adjustable means carried on said last-mentioned member and engageable with said body to limit the movement of said member and thereby said actuator to retain said latching mechanism in a predetermined position, and means forming a passage connecting the discharge side of the control valve with said air chamber for delivery of fluid therethrough into said air chamber for hydraulic compression of the air in said air chamber to actuate said flexible wall outwardly to release said latching mechanism for self-closing of said self-closing valve.

3. A control valve comprising in combination a valve body having a passage therein for the flow of fluid through the body, a self-closing valve in said body for closing said passage to the flow of fluid, manually actuated means connected with said self-closing valve for opening the same, means forming a closed air chamber in said valve body in which air pressure is created due to operation of the control valve, said air chamber having a flexible wall, said self-closing valve having a slidably mounted stem extending into said air chamber, a latching mechanism including a latching member on said stem having a shoulder transverse to the sliding of said stem and a detent member engageable with said shoulder for holding said stem in the open position and including an actuator connected with said detent member for releasing said latching member therefrom, said actuator having one end connected with said flexible wall and the other end thereof having external threads, means biasing said flexible wall inwardly of said air chamber to urge said detent means into engagement with said latching member, said stem having passage means therein connecting the discharge side of the control valve with said air chamber for delivery of liquid from the discharge side of the control valve into said chamber for hydraulic compression of the air, with resultant pressure of actuation of said flexible wall by the air so compressed in said chamber to release said latching mechanism for self-closing of said self-closing valve, and threaded means for selectively limiting movement of said detent member to vary the degree of engagement of said detent member with said latching member, whereby the amount of pressure necessary to disengage said latching mechanism is varied.

4. A control valve comprising in combination, a valve body having a passage therein for the flow of fluid through the body, a self-closing valve in said body for closing said passage to the flow of fluid, manually actuated means connected with said self-closing valve for opening the same, means forming a closed air chamber in said valve body, said air chamber having a flexible wall, an actuator within said air chamber connected to said flexible wall, a slidably mounted stem extending from said valve into said air chamber, latching means within said air chamber and including a latching member on said stem, said latching member having a shoulder thereon transverse to the sliding of said stem, detent means on said actuator and engageable with said shoulder to hold said valve in the open position, means biasing said flexible wall inwardly of said air chamber to urge said detent means into engagement with said latching member, said stem having passage means therein connecting the discharge side of the control valve with said air chamber for delivery of fluid from the discharge side of the control valve into said air chamber for hydraulic compression of the air with resultant pressure actuation of said flexible wall by the air so compressed in the air chamber to release said latching mechanism for self-closing of said self-closing valve, and threaded means adjustable on said actuator and contacting said body for limiting the inward movement of said detent member to vary the degree of engagement of said detent member with said latching member.

References Cited in the file of this patent

UNITED STATES PATENTS

| 1,998,913 | Wheaton | Apr. 23, 1935 |
| 2,320,033 | Davis | May 25, 1943 |
| 2,329,426 | Valiton | Sept. 14, 1943 |
| 2,540,941 | Graham | Feb. 6, 1951 |
| 2,626,632 | Hillman | Jan. 27, 1953 |
| 2,630,832 | Lutherer | Mar. 10, 1953 |
| 2,633,866 | Reasoner | Apr. 7, 1953 |

FOREIGN PATENTS

| 55,183 | Netherlands | 1943 |